(12) United States Patent
Harger et al.

(10) Patent No.: US 6,994,244 B2
(45) Date of Patent: Feb. 7, 2006

(54) EXOTHERMIC WELDING

(75) Inventors: Timothy R. Harger, Libertyville, IL (US); Spencer Heynis, Wauconda, IL (US); Mark S. Harger, Libertyville, IL (US)

(73) Assignee: Harger, Inc., Grayslake, IL (US)

( * ) Notice: Subject to any disclaimer, the term of this patent is extended or adjusted under 35 U.S.C. 154(b) by 234 days.

(21) Appl. No.: 10/431,254

(22) Filed: May 7, 2003

(65) Prior Publication Data

US 2004/0222274 A1 Nov. 11, 2004

(51) Int. Cl.
*B23K 31/02* (2006.01)

(52) U.S. Cl. .................................. 228/234.3
(58) Field of Classification Search ............... 228/234.3
See application file for complete search history.

(56) References Cited

U.S. PATENT DOCUMENTS

| | | | | |
|---|---|---|---|---|
| 4,879,452 A | * | 11/1989 | Kovarik et al. | 219/130.4 |
| 5,279,455 A | * | 1/1994 | Fuchs | 228/234.3 |
| 5,715,886 A | * | 2/1998 | Fuchs | 164/54 |
| 6,382,496 B1 | | 5/2002 | Harger | |
| 6,553,911 B1 | * | 4/2003 | Walker et al. | 102/202.7 |
| 6,793,003 B2 | * | 9/2004 | Triantopoulos et al. | 164/349 |
| 2004/0003907 A1 | * | 1/2004 | Moore et al. | 164/54 |

OTHER PUBLICATIONS

Harger "Harger Lightning and Grounding –Master Equipment Catalog," Issue 1/02, pp 1–8, 243 and 250–253.
"Low Emissions Welded Connection Satisfies Clean Room Requirements "Electrical Construction and Maintenance, Sep. 1992, cover and 3 unnumbered pages.

* cited by examiner

*Primary Examiner*—Lynne Edmondson
(74) *Attorney, Agent, or Firm*—Cook, Alex, McFarron, Manzo, Cummings & Mehler, Ltd.

(57) ABSTRACT

An assembly and method are disclosed for exothermic welding including a mold which is formed of a material which withstands exothermic welding temperatures, and includes a weld cavity therein for positioning at least two members which are to be exothermically welded together adjacent to each other, and an ignition cavity communicating with the first cavity. The members which are to be exothermically welded together are positioned adjacent to each other using the weld cavity, and a weld metal cartridge is positioned in the ignition cavity. The cartridge comprises a container having copper walls which define a chamber therein, and a particulate weld metal in the chamber. The tip of an electrical igniter is positioned into the chamber of the container and particulate weld material therein, the igniter is electrically fired while the container is in the ignition cavity of the mold to melt the particulate weld material, and the contents of the ignition cavity are passed after melting the particulate weld metal to the weld cavity to weld the members together.

62 Claims, 2 Drawing Sheets

EXOTHERMIC WELDING

BACKGROUND AND SUMMARY OF THE INVENTION

The present invention relates to exothermic welding and improved assemblies and methods therefor.

Exothermic welding has been employed in the past as an effective method of welding two or more members together which may be copper and/or steel, such as cables to cables, cables to ground rods, cables to steel surfaces including plates and pipes, cables to bus bars, cables to rebar and the like. Such exothermic welding eliminates the need for an outside source of heat or power and produces a permanent, corrosion resistant weld which cannot loosen and does not increase electrical resistance.

To accomplish such welds the members to be welded together are positioned adjacent to each other utilizing a welding cavity in a mold formed of a material, such as graphite, which is capable of withstanding the extremely high temperatures of the exothermic welding process. Another ignition cavity in the mold contains a loose particulate weld metal which is to be ignited to initiate the welding process. A metal disk, which typically is a tin plated steel, is first positioned in the ignition cavity to prevent the loose particulate weld metal from flowing into the welding cavity in which the materials are to be welded together prior to ignition. The loose particulate weld metal is then poured from a container, e.g. plastic, into the ignition cavity, the plastic container is discarded and the mold cover is closed. In order to initiate ignition, a spark generator ignites the loose particulate weld metal which melts in the ignition cavity to melt the metal disk and the molten weld metal flows from the ignition cavity into the weld cavity to weld the members together.

The particulate weld metal in exothermic welding is a mixture of copper oxide and aluminum which, when ignited, produces the following chemical reaction

$$3Cu_2O+2Al \rightarrow 6Cu+Al_2O_3+\text{heat } (4600° \text{ F.}).$$

In order to initiate ignition by spark, the container in which the particulate weld metal is shipped usually contains two different particle grain sizes of weld metal. A finer grain size of weld metal is first packed at the bottom 1/10 or so of the container, and the remainder of the container is then filled with a courser grain size weld metal. Thus, when the particulate weld metal is poured from the container into the ignition cavity in the mold, the courser size weld metal flows first from the container into the cavity, and then the finer grain size weld metal flows on top of the courser grain size, whereby the finer grain size weld metal which is more easily ignited is exposed and presented to the spark to initiate ignition of the entire quantity of both fine and course grain size particulate weld metal.

It would be desirable to be able to eliminate the finer grain size particulate weld metal and only utilize a single uniform courser grain size for several reasons. One reason is the added expense involved in providing two grain sizes and packing the two different grain sizes in the container. Even more significantly, special shipping restrictions apply in the case of the finer grain weld metal because it is more susceptible to ignition than the courser grain particulate weld material.

It would also be desirable to eliminate the need for the tin plated steel disk which must first be inserted in the ignition cavity to retain the loose particulate weld material in the cavity prior to ignition. This would eliminate the need for the separate disk insertion step, the need to provide a disk at all, and would result in cleaner welds and cleaner molds after the welding procedure has been carried out.

It would also be desirable to eliminate the need for the plastic container from which the particulate weld metal is poured into the ignition cavity and the cumbersome step of having to pour the loose particulate weld material into the cavity and the need to dispose of the plastic container.

A smokeless exothermic welding procedure is currently available for exothermic welding in clean room environments. In such smokeless procedure a filter is employed with the mold to trap most of the emissions created in the exothermic welding process while allowing the heated air to escape through the filter. In the smokeless procedure the particulate weld material is ignited electrically by a battery powered ignitor. The electric ignitors in the smokeless procedure eliminate the need for the finer grain more easily ignitable weld metal. However, the smokeless procedure which has been employed in the past has not attained the other desirable goals heretofore described.

In the present invention the need for the finer grain more easily ignitable weld metal is not only eliminated, but the need for the tin plated steel disk as well as the plastic container for the particulate weld material is also eliminated together with the steps of inserting the steel disk in the mold cavity and the need to pour the loose particulate weld material from the container into the ignition cavity. All of these desirable goals are achieved in the present invention while enjoying cleaner molds following a welding procedure as well as cleaner welds.

In one principal aspect of the present invention, an exothermic welding assembly comprises a mold formed of a material which withstands exothermic welding temperatures. The mold has a first cavity therein for positioning at least two members which are to be exothermically welded together adjacent to each other, and a second cavity communicating with the first cavity. A weld metal cartridge is positioned in the second cavity. The cartridge includes a container having a top, a side wall and a bottom wall, with the side wall and bottom wall defining a chamber, a particulate weld metal in the chamber, and a cover covering the top and retaining the particulate weld metal in the chamber. An igniter including an electrical conductor extends into the mold, and a tip on the igniter extends into the particulate weld metal to ignite the weld metal in the chamber of the container.

In another principal aspect of the present invention, a method of exothermic welding comprises the steps of providing a mold formed of a material which withstands exothermic welding temperatures. The mold has a first cavity therein for positioning at least two members which are to be exothermically welded together adjacent to each other using the first cavity. A weld metal cartridge is positioned in the second cavity. The cartridge comprises a container having walls which define a chamber therein, and a particulate weld metal in the chamber. The tip of an electrical igniter is positioned into the chamber of the container and particulate weld material therein, the igniter is electrically fired while the container is in the second cavity of the mold to melt the particulate weld metal, and the contents of the second cavity after melting of the particulate weld metal are passed to the first cavity to weld the members together.

In still another principal aspect of the present invention, in the aforementioned assembly and method the particulate weld metal is a mixture of copper oxide and aluminum.

In still another principal aspect of the present invention, in the aforementioned assembly and method the walls of the container are metal, and preferably copper.

In still another principal aspect of the present invention, in the aforementioned assembly and method a cover is on the chamber, and preferably the cover is a film and/or cap.

In still another principal aspect of the present invention, in the aforementioned assembly and method the igniter tip is positioned in the particulate weld metal in the chamber by puncturing the cover on the chamber.

In still another principal aspect of the present invention, in the aforementioned assembly and method the mold includes an opening communicating between the exterior of the mold and the second cavity, and the igniter tip is inserted through the opening to puncture the cover on the chamber.

In still another principal aspect of the present invention, in the aforementioned assembly and method the mold includes an opening communicating between the exterior of the mold and the second cavity, and the igniter tip is inserted through the opening to position it into the chamber of the container and the particulate weld material therein.

In still another principal aspect of the present invention, in the aforementioned assembly and method the igniter tip is stainless steel or tungsten.

In still another principal aspect of the present invention, in the aforementioned assembly and method the particulate weld metal is of substantially uniform particle size throughout the chamber, and the tip of the electrical igniter is positioned in the substantially uniform particle size particulate weld metal.

These and other objects, features and advantages of the present invention will be more clearly understood through a consideration of the following detailed description.

BRIEF DESCRIPTION OF THE DRAWINGS

In the course of this description, reference will frequently be made to the attached drawings in which.

DESCRIPTION OF THE PREFERRED EMBODIMENT

Figure 1:
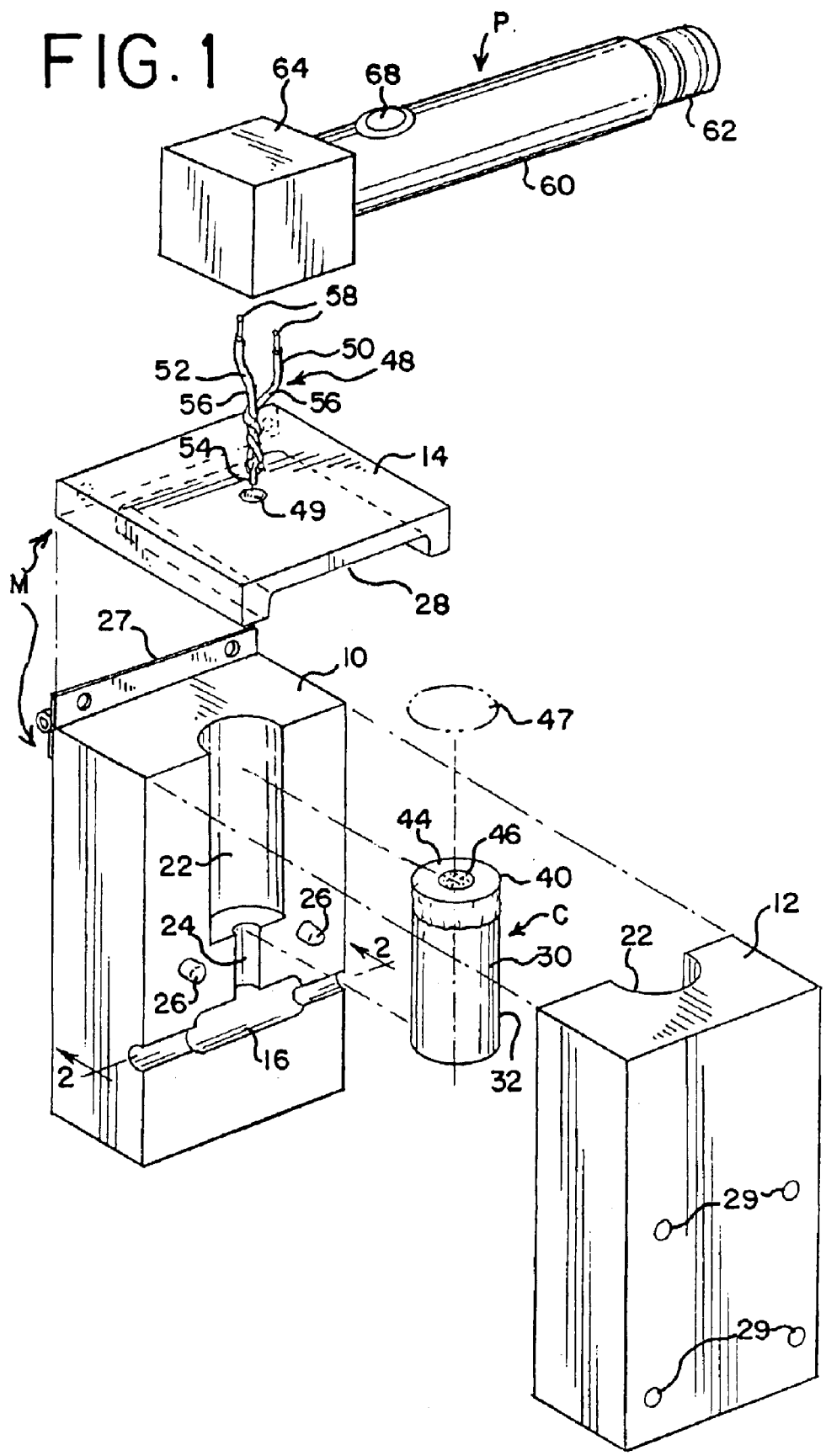
FIG. 1 is an overall perspective, exploded view of a preferred embodiment of exothermic welding assembly of the present invention.
Figure 2:
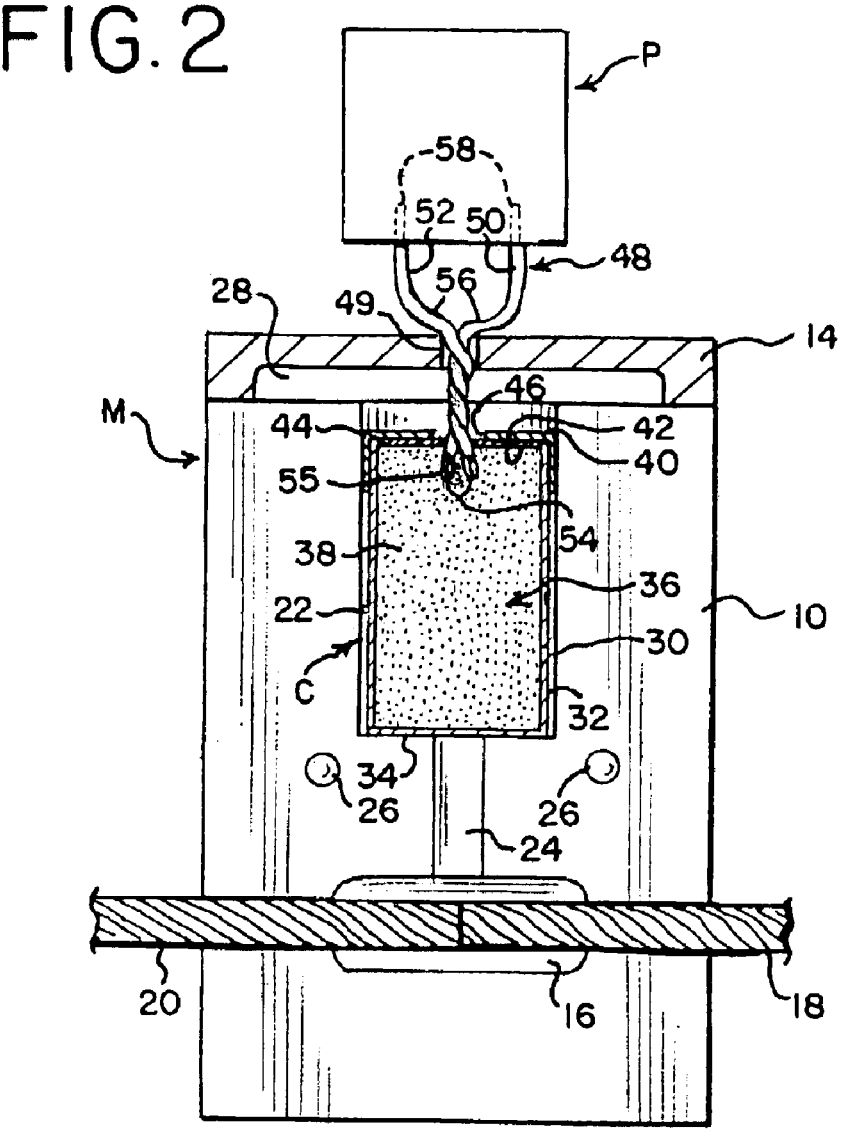
FIG. 2 is a cross-sectioned elevation view of the assembly as viewed substantially along line 2—2 in FIG. 1 which has been assembled in readiness for initiation of the welding procedure.

With particular reference to FIGS. 1 and 2, a preferred embodiment of exothermic welding assembly of the invention and for practicing the method of the invention comprises a mold M formed of a suitable material, such as graphite, for withstanding the extremely high temperatures of the exothermic welding process. The mold M as typically employed in exothermic welding is comprised of two mold halves 10 and 12 and a cover 14 as shown in FIG. 1. Mold half 10 includes one half of a weld cavity 16 which, for example as shown in FIG. 2, receives two members, such as cables 18 and 20, to position the cables in a closely adjacent relationship to each other to be exothermically welded together in the weld cavity 16. Although the members 18 and 20 as shown in the drawings as the members to be welded together are two cables, the members may be plates, pipes, rebar, etc., and the weld cavity 16 may open to a face of the mold M to accommodate such other shapes for example as shown in U.S. Pat. No. 6,382,496 which is incorporated herein in its entirety by reference.

Mold half 10 also includes a second vertically extending one half ignition cavity 22 which opens to the top of mold half 10 as seen in FIGS. 1 and 2. Cavities 16 and 22 are connected by a passage 24 which permits the molten exothermic weld metal to flow between the ignition cavity 22 to the weld cavity 16 to weld the members 18 and 20 together in the welding process.

Although not fully shown in the drawings, the side of the other mold half 12 which faces mold half 10 includes the other complementary half of weld cavity 16, ignition cavity 22 and passage 24 to complete the cavities and passage when the mold halves are assembled together.

In addition, a pair of guide pins 26 extend from the face of the mold half 10 which faces mold half 12 to enter complementary recesses (not shown) in mold half 12 to assure accurate alignment of the mold halves when they are assembled together. Although the pins 26 are shown extending from the face of mold half 10, the location of the pins can be reversed without departing from the invention, i.e. the pins 26 may be positioned on mold half 12 and recesses on mold half 10.

The mold M is completed by the cover 14 which covers the ignition cavity 22 when the exothermic reaction is to be initiated. The cover 14 is preferably hinged to mold half 10 by a hinge 27 as shown in FIG. 1. The cover also includes a passage 28 which extends from one side of the cover 14 to over the ignition cavity 22 to permit venting of the gases and heat generated during the exothermic welding procedure. In the alternative passage 28 may also include suitable filters or the like for smokeless welding.

As in typical exothermic welding molds, the two mold halves 10 and 12 are held together by a suitable handle clamp (not shown). Accordingly, recesses 29 are shown on mold half 12 in FIG. 1 to accommodate the handle clamp. A suitable clamping arrangement is shown in the aforementioned U.S. Pat. No. 6,382,496.

Thus far, the mold which has been described is essentially conventional in the exothermic welding art.

In the preferred embodiment of the present invention a particulate weld metal cartridge C is provided which comprises a container 30 having a generally cylindrical side wall 32 and a bottom wall 34 which together define a chamber 36 which is substantially filled with a particulate weld metal 38 as best seen in FIG. 2. The container side wall 32 and bottom wall 34 are preferably formed of a metal, and most preferably of copper. And, as previously mentioned, the particulate weld metal 38 is a mixture of copper oxide and aluminum particles.

The top 40 of the container 30 is covered to ensure retention of the particulate weld metal 38 in the container during shipping and handling. The cover preferably includes a paper or plastic film 42 covering the particulate weld metal 38. The cover also preferably includes a more durable cap 44 which is preferably formed of the same metal as the container 30. The cap 44 includes an opening 46 in the top to provide access to the film 42 and weld metal 38 by the igniter as will be described to follow. As an alternative to the film 42 which is shown under the cap 44 in FIG. 2, a film disk 47 may be provided as shown in dot and dash in FIG. 1 to cover the top of the cap and the opening 46 to prevent loss of the weld metal 38 through the opening 46 during shipping and handling.

The preferred embodiment of assembly of the present invention also includes an electrical igniter 48 which is insertable through an opening 49 in the mold cover 14. The igniter comprises a pair of conductors 50 and 52 preferably of copper and which are preferably twisted together as shown in the drawings for rigidity and stability. An ignitor tip 54 is joined to the ends 55 of the respective conductors 50 and 52 in a suitable manner, such as by crimping onto the ends. The tip 54 is preferably a wire which is formed of a suitable material which heats when electricity is passed through it to a sufficient temperature to ignite the particulate weld metal 38. Suitable materials for the tip 54 may include tungsten or stainless steel.

The conductors 50 and 52 are preferably covered over most of their length with an insulation material 56. The insulation material 56 may either be a polymer or painted on such as in motor magnetic wire. The ends 58 of the conductors 50 and 52 opposite the tip 54 are left uninsulated so that they can be electrically coupled to a power source P for firing the ignitor 48.

Figure 3:
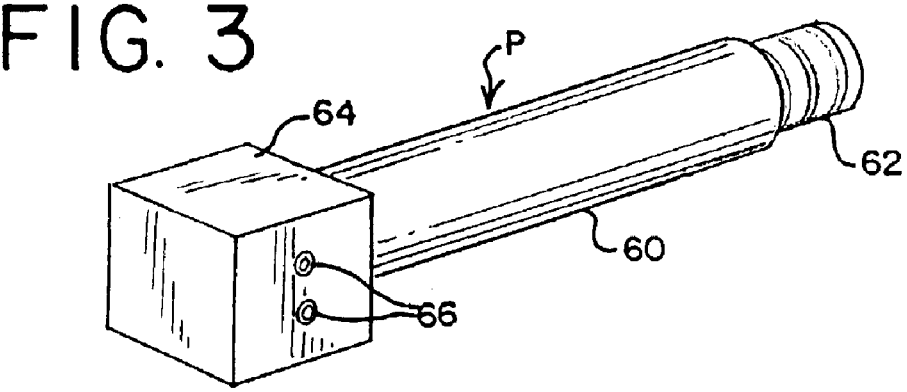
FIG. 3 is a perspective view of a preferred embodiment of electrical power source for firing the ignitor of the present invention to initiate the exothermic reaction which has been rotated 90° from the power source shown in FIG. 1.

A preferred power source P is shown in FIGS. 1 and 3. The power source P comprises a generally cylindrical body 60 which contains a battery (not shown) and which may be gripped by the hand of the person who is initiating the exothermic welding procedure. A closure 62 closes one end of the body to seal the battery in the body 60, and a head 64 is positioned at the other end of the body and which contains a pair of sockets 66 for receiving the conductor ends 58 during the firing process. A switch button 68 is also positioned on the body for energizing the sockets 66 by the thumb of the operator.

The battery is preferably a rechargeable battery having sufficient capacity to generate enough energy for initiating several ignitions before charging is required. Such capacity would be provided for example by a NiCd battery of 3.6v. Recharging may be accomplished by way of suitable connections (not shown) though the closure 62 or the head 64.

To practice the exothermic welding procedure in accordance with the present invention the members 18 and 20 to be welded together are positioned adjacent to each other in the weld cavity 16 as shown in FIG. 2. The two mold halves 10 and 12 are then placed together and clamped into position by handle clamps (not shown). As previously mentioned suitable handle clamps and clamping procedures are disclosed in U.S. Pat. No. 6,382,496, which previously has been incorporated herein by reference.

The cartridge with the particulate weld metal 38 therein is inserted in its entirety in the ignition cavity 22 as shown in FIG. 2. The mold cover 14 is then closed to cover the cartridge C in cavity 22. The igniter 48 is then inserted through the opening 49 in the cover 14, through the top 40 of the container 30, through the opening 46 in the cap 44, and the tip 54 of the ignitor punctures the film 42 (or the film disk 47) so that the tip 54 is positioned in the particulate weld metal 38 as shown in FIG. 2.

The exothermic welding procedure is now ready for initiation. To ignite the particulate weld metal 38 the power source P is positioned so that its sockets 66 contain the conductor ends 58 as shown in FIG. 2. The switch button 68 is then actuated to pass electrical energy from the battery of the power source P through the conductors 50 and 52 to cause the ignitor tip 54 to heat to a temperature sufficient to fire the particulate weld metal 38. When the particulate weld metal is ignited, it undergoes the chemical reaction set forth earlier in this specification to generate substantial heat to melt the particulate weld metal, the side wall 32 and bottom wall 34 of the container 30, the cover 44 of the container and the lower end of the igniter 48 which results in these molten materials flowing through passage 24 and into weld cavity 16 to surround the members 18 and 20 and weld them together once the molten materials have solidified.

Upon completion of the welding procedure, the mold halves 10 and 12 are then separated, and the welded together members 18 and 20 are removed from the mold M.

In the preferred embodiment of exothermic welding assembly and method which has been described, the need for a separate plastic container for the particulate weld metal and providing and placing the tin plated steel disk are eliminated as is the cumbersome step of pouring the weld metal into the mold from such container. Instead the container 30 itself with the weld metal therein is inserted as a unit into the mold. Moreover, the need for the finer grain more easily ignited weld metal as in the past is eliminated and the particulate weld metal 38 in the cartridge C may be the generally uniform larger grain size throughout. This eliminates the disadvantages which were previously presented where the two different grain size materials had to be loaded in the container and the disadvantages in the shipping of the fine grained weld metals which were susceptible by design to relatively easy ignition. It has also been discovered that the mold and the weld itself is substantially cleaner after the welding procedure is carried out in accordance with the present invention than when the prior exothermic welding procedures are practiced. And, the exothermic welding assembly and method of the invention may be employed in both conventional as well as smokeless exothermic welding procedures.

It will be understood that the preferred embodiment of the present invention which has been described as merely illustrative of the principles of the invention. Numerous modifications may be made by those skilled in the art without departing from the true spirt and scope of the invention.

We claim:

1. A weld metal cartridge for exothermic welding comprising:

a container having a top, a side wall and a bottom wall, said side wall and bottom wall defining a chamber therein;

a particulate weld metal in said chamber;

a cover covering said top and retaining said particulate weld metal in said chamber, said cover being puncturable to permit access to said particulate weld metal from outside of said container; and said side wall and bottom wall of said container are positioned relative to said particulate weld metal and are formed of a metal so that said walls melt with said particulate weld metal during the welding procedure.

2. The cartridge of claim 1, wherein said particulate weld metal is a mixture of copper oxide and aluminum.

3. The cartridge of claim 2, wherein said metal of said side wall and bottom wall is copper.

4. The cartridge of claim 1, wherein said metal of said side wall and bottom wall is copper.

5. The cartridge of claim 1, wherein said cover is a film.

6. The cartridge of claim 5, wherein said cover also includes a metal cap.

7. The cartridge of claim 6, wherein said metal cap has an opening therein.

8. The cartridge of claim 3, wherein said cover is a film, said cover also includes a metal cap which substantially covers the first mentioned film, and said metal cap has an opening therein.

9. The cartridge of claim 1, wherein said particulate weld metal is of substantially uniform particle size throughout said chamber.

10. An exothermic welding assembly, comprising:
a mold formed of a material which withstands exothermic welding temperatures, said mold having a first cavity therein for positioning at least two members which are to be exothermically welded together adjacent to each other, and a second cavity communicating with said first cavity;
a weld metal cartridge positioned in said second cavity, said cartridge including a container having a top, a side wall and a bottom wall, said side wall and bottom wall defining a chamber, a particulate weld metal in said chamber, and a cover covering said top and retaining said particulate weld metal in said chamber;
an igniter including an electrical conductor extending into said mold, and a tip on said igniter extending into said particulate weld metal to ignite said weld metal in said chamber of said container; and
said side wall and bottom wall of said container are positioned relative to said particulate weld metal and are formed of a material so that said walls melt with said particulate weld metal during the welding procedure.

11. The assembly of claim 10, wherein said cover is puncturable to permit access to said particulate weld metal from outside of said container.

12. The assembly of claim 11, wherein said igniter tip punctures said cover.

13. The assembly of claim 12 wherein said particulate weld metal is a mixture of cooper oxide and aluminum.

14. The assembly of claim 11, wherein said side wall and said bottom wall of said container are metal.

15. The assembly of claim 14, wherein said metal of said walls is copper.

16. The assembly of claim 10, wherein said side wall and said bottom wall of said container are metal.

17. The assembly of claim 16, wherein said metal of said walls is copper.

18. The assembly of claim 10, wherein said cover is a film.

19. The assembly of claim 18, wherein said cover also includes a metal cap, and said igniter tip passes through both said film and said cap.

20. The assembly of claim 19, wherein said metal cap has an opening therein and said igniter tip passes through said opening in said metal cap.

21. The assembly of claim 10, wherein said igniter tip is steel or tungsten.

22. The assembly of claim 21, wherein said steel is stainless steel.

23. The assembly of claim 13, wherein said side wall and said bottom wall of said container are copper, said cover is a film, and said cover also includes a metal cap, said metal cap has an opening therein, said igniter tip passes through said opening in said metal cap, an wherein said igniter tip is stainless steel or tungsten.

24. The assembly of claim 10, wherein said particulate weld metal is of substantially uniform particle size throughout said chamber.

25. The assembly of claim 10, including an opening communicating with said second cavity in said mold, and said igniter extends through said opening with its tip in said second cavity.

26. A subassembly for exothermic welding, comprising:
a container having walls which define a chamber;
a particulate weld metal in said chamber which melts when ignited; and
said walls of said container are positioned relative to said particulate weld metal and are formed of a material so that said walls melt with said particulate weld metal during the welding procedure.

27. The subassembly of claim 26, wherein said particulate weld metal is a mixture of copper oxide and aluminum.

28. The subassembly of claim 27, wherein said walls of said container are metal.

29. The subassembly of claim 28, wherein said metal of said walls is copper.

30. The subassembly of claim 26, wherein said walls of said container are metal.

31. The subassembly of claim 30, wherein said metal of said walls is copper.

32. The subassembly of claim 26, including an igniter having an electrical conductor and a tip on said igniter which extends into said chamber of said container and said particulate weld metal therein to ignite said weld metal in the chamber of said container.

33. The subassembly of claim 32, including a cover on said chamber.

34. The subassembly of claim 34, wherein said cover is a film.

35. The subassembly of claim 35, wherein said cover also includes a metal cap.

36. The subassembly of claim 36, wherein said metal cap has an opening therein.

37. The subassembly of claim 32, wherein said igniter tip is steel or tungsten.

38. The subassembly of claim 34, wherein said cover is a metal cap.

39. The subassembly of claim 38, wherein said steel is stainless steel.

40. The subassembly of claim 34, wherein said igniter tip punctures said cover on said chamber to extend into said particulate weld metal.

41. The, subassembly of claim 32, wherein said walls of said container are copper, said cover is a film, and wherein said cover also includes a metal cap, said metal cap has an opening therein, said igniter tip passes through said opening in said metal cap, and wherein said igniter tip is stainless steel or tungsten.

42. The subassembly of claim 26, wherein said particulate weld metal is of substantially uniform particle size throughout said chamber.

43. A method of exothermic welding, comprising the steps of:
providing a mold formed of a material which withstands exothermic welding temperatures, said mold having a first cavity therein for positioning at least two members which are to be exothermically welded together adjacent to each other, and a second cavity communicating with said first cavity;
positioning said members which are to be exothermically welded together adjacent to each other in said first cavity;
positioning a weld metal cartridge in said second cavity, said cartridge comprising a container having walls which define a chamber therein, and a particulate weld metal in said chamber;
positioning the tip of an electrical igniter into the chamber of the container and particulate weld material therein;
electrically firing said igniter while said container is in said second cavity of said mold to melt the particulate weld material and said container walls; and passing the contents of said second cavity after melting of said particulate weld metal and said container walls to said first cavity to weld said members together.

44. The method of claim 43, wherein said particulate weld metal is a mixture of copper oxide and aluminum.

45. The method of claim 44, wherein said walls of said container are metal.

46. The method of claims 45, wherein said metal of said walls is copper.

47. The method of claim 43, wherein said walls of said container are metal.

48. The method of claim 47, wherein said metal of said walls is copper.

49. The method of claim 43, including a cover on said chamber.

50. The method of claim 49, wherein said cover is a film.

51. The method of claim 50, wherein said igniter tip is positioned in said particulate weld metal in said chamber by puncturing said cover on said chamber.

52. The method of claim 51, wherein said mold includes an opening communicating between the exterior of the mold and said second cavity, and said igniter tip is inserted through said opening to puncture said cover.

53. The method of claim 43, wherein said mold includes an opening communicating between the exterior of the mold and said second cavity, and said igniter tip is inserted through said opening to position it into the chamber of the container and the particulate weld material therein.

54. The method of claim 43, wherein said igniter tip is steel or tungsten.

55. The method of claim 54, wherein said steel is stainless steel.

56. The method of claim 43, wherein said particulate weld metal is of substantially uniform particle size throughout said chamber, and the tip of the electrical igniter is positioned in said substantially uniform particle size particulate weld metal.

57. An igniter for igniting a particulate exothermic weld metal, comprising:

a pair of longitudinally extending electrical conductors twisted together;

insulation insulating said electrical conductors from each other over a substantial amount of their length; and an igniter tip at a first end of said electrical conductors, the other end of said conductors being adapted to be coupled to a source of electrical power sufficient to cause said tip to heat to ignite the particulate exothermic weld metal.

58. The igniter of claim 57, wherein said electrical conductors are formed of a metal including copper.

59. The igniter of claim 58, wherein said igniter tip is steel or tungsten.

60. The igniter of claim 59, wherein said steel is stainless steel.

61. An igniter for igniting a particulate exothermic wel metal, comprising:

a pair of longitudinally extending electrical conductors;

insulation insulating said electrical conductors from each other over a substantial amount of their length; and an igniter tip of steel or tungsten at a first end of said electrical conductors, the other end of said conductors being adapted to be coupled to a source of electrical power sufficient to cause said tip to heat to ignite the particulate exothermic weld metal.

62. The igniter of claim 33, wherein said steel is stainless steel.

\* \* \* \* \*